Dec. 10, 1935.   A. J. MASON ET AL   2,023,738
MEANS FOR ASSEMBLING AND SECURING RADIATING FINS ON TUBES
Filed Jan. 30, 1931   3 Sheets-Sheet 1
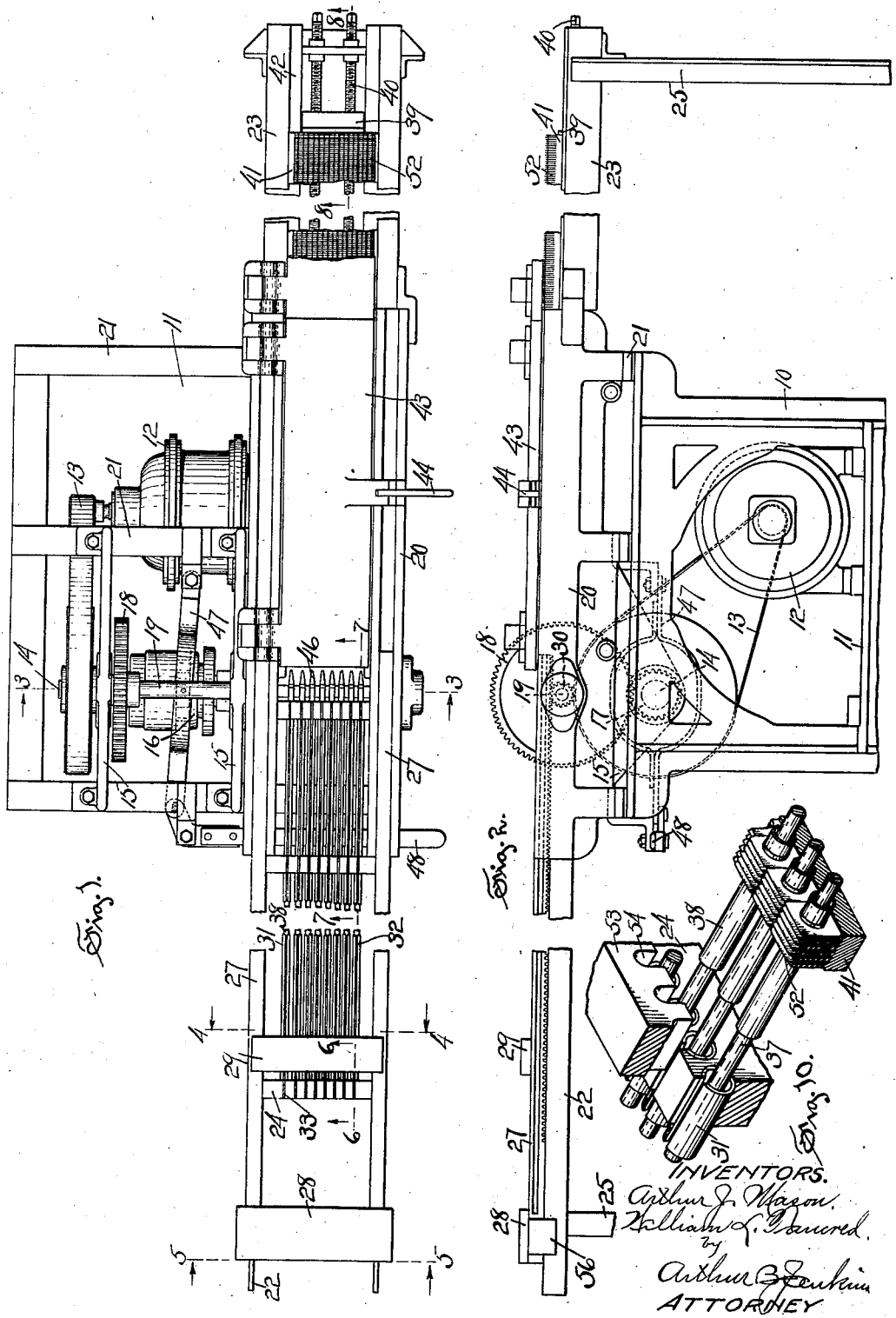

Dec. 10, 1935.   A. J. MASON ET AL   2,023,738
MEANS FOR ASSEMBLING AND SECURING RADIATING FINS ON TUBES
Filed Jan. 30, 1931   3 Sheets-Sheet 2
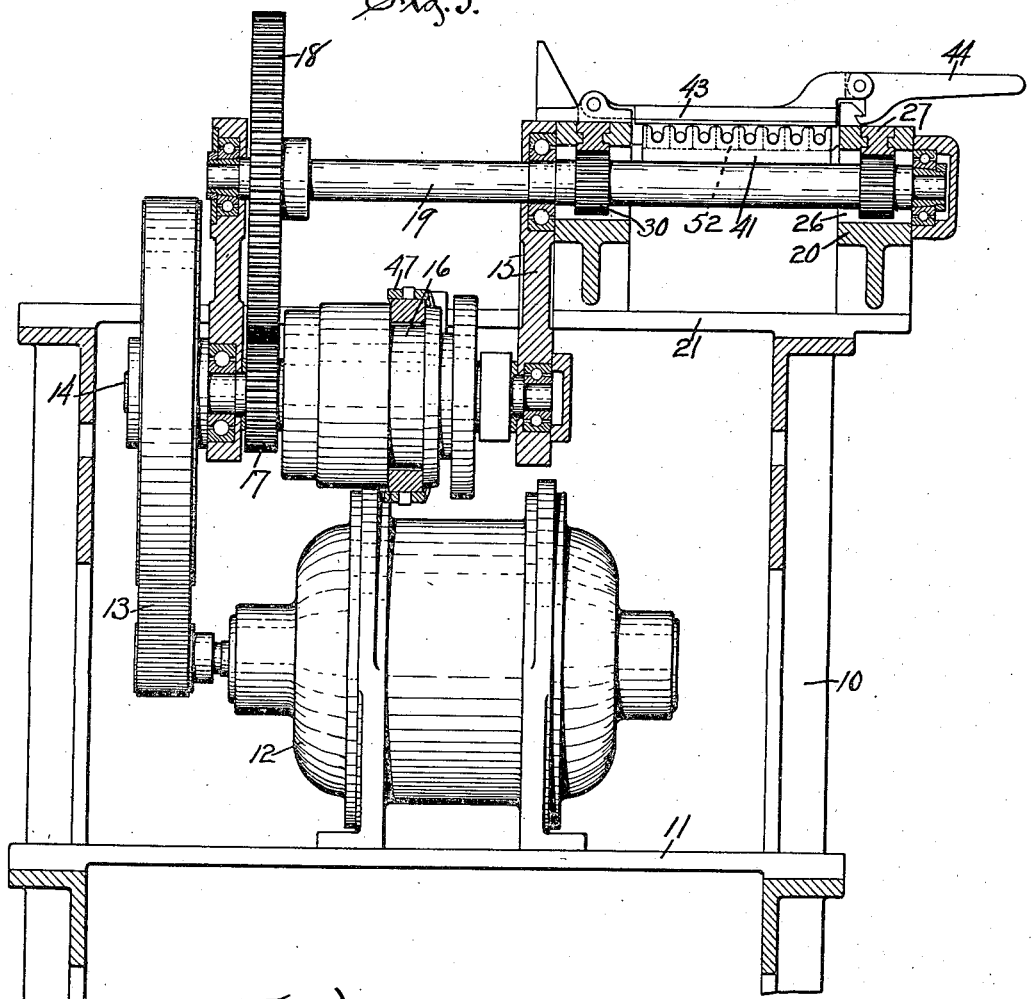
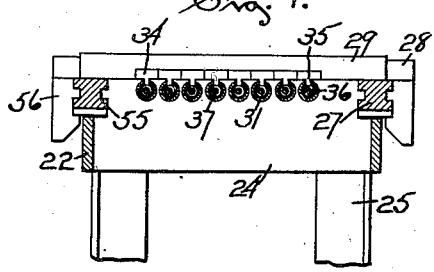
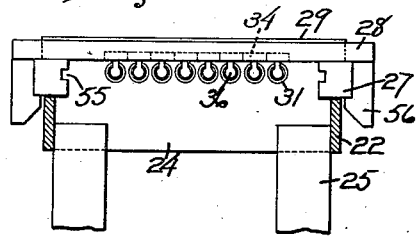
INVENTORS.
Arthur J. Mason.
William L. Francred.
by
Arthur B. Jenkins.
ATTORNEY Dec. 10, 1935.  A. J. MASON ET AL  2,023,738
MEANS FOR ASSEMBLING AND SECURING RADIATING FINS ON TUBES
Filed Jan. 30, 1931  3 Sheets-Sheet 3
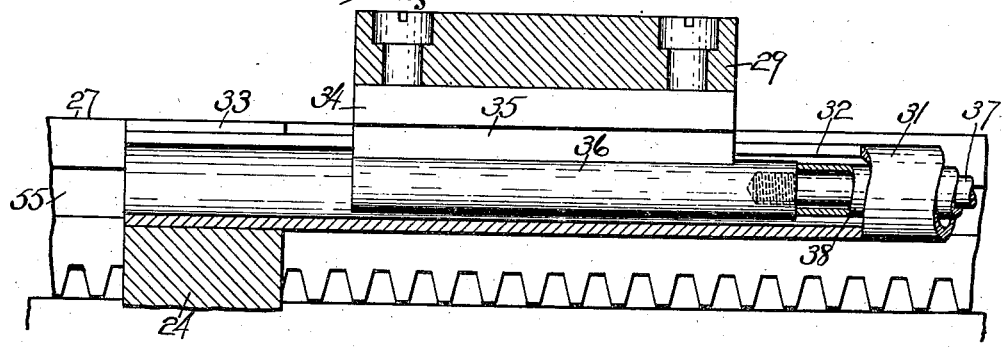
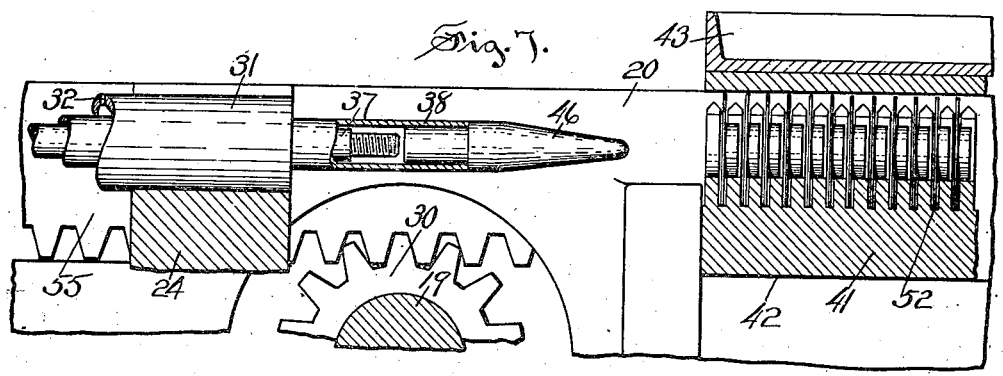
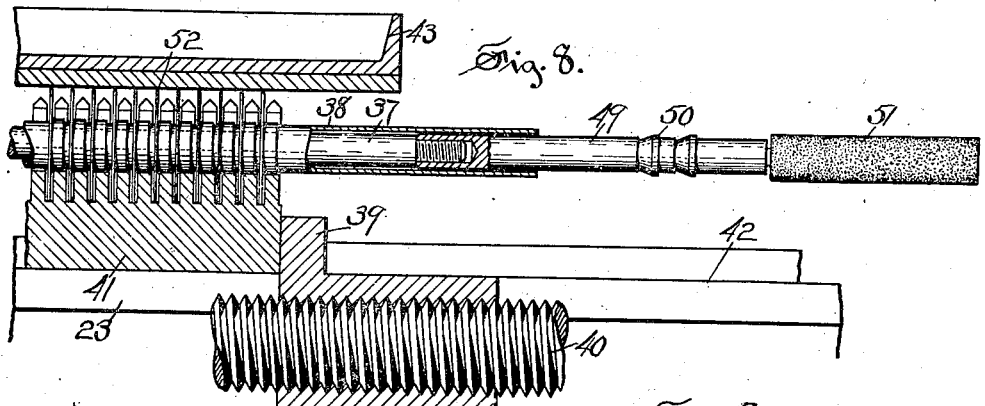
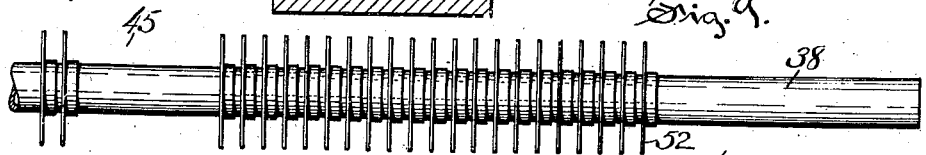
INVENTORS.
Arthur J. Mason.
William L. Tancred.
by
Arthur B. Jenkins,
ATTORNEY Patented Dec. 10, 1935

2,023,738

UNITED STATES PATENT OFFICE 2,023,738

MEANS FOR ASSEMBLING AND SECURING RADIATING FINS ON TUBES

Arthur J. Mason, West Hartford, and William L. Tancred, Hartford, Conn., assignors to The Bush Manufacturing Company, Hartford, Conn., a corporation of Connecticut Application January 30, 1931, Serial No. 512,274

8 Claims. (Cl. 153—80.5)

Our invention relates to the class of machines employed for assembling radiating fins upon conducting tubes and for securing the fins in place upon said tubes; and an object of our invention, among others, is the production of a machine of this class that shall be simple in construction and particularly efficient and rapid in operation.

One form of a machine embodying our invention and in the construction and use of which the objects herein set out, as well as others, may be attained is illustrated in the accompanying drawings, in which—

Figure 1 is a top view of a machine embodying our invention, with parts broken away to show construction and with other parts broken out to reduce the length of the machine;

Figure 2 is a front view of the machine with parts broken out;

Figure 3 is a view, scale enlarged, in vertical section on a plane denoted by the dotted line 3—3 of Figure 1;

Figure 4 is a similar view on a plane denoted by the dotted line 4—4 of Figure 1;

Figure 5 is another sectional view on a plane denoted by the dotted line 5—5 of Figure 1;

Figure 6 is a sectional view, scale still further enlarged, on a plane denoted by the dotted line 6—6 of Figure 1;

Figure 7 is a similar view on a plane denoted by the dotted line 7—7 of Figure 1;

Figure 8 is another similar view on a plane denoted by the dotted line 8—8 of Figure 1;

Figure 9 is a side view of a portion of the finished product; and

Figure 10, sheet 1, is a detail isometric view illustrating the manner of holding the tubes during the expanding operations.

In the accompanying drawings the numeral 10 denotes the standards of a base frame that is substantially rectangular in shape when viewed in plan, said frame comprising a shelf 11 for a motor 12 used to operate the machine. The motor is connected, as by means of a belt 13, with a pulley on a clutch shaft 14 mounted in bearings in hangers 15 supported on the base frame. This shaft supports a reversing mechanism including a clutch member 16 which mechanism is of old and well known construction and will be readily understood by those skilled in the art, and for which purpose a further and detailed description is omitted herein, it being sufficient to state that a movement of the clutch member in opposite directions will cause rotation of a pinion 17 in opposite directions, the pinion being loosely mounted upon the shaft 14. Said pinion meshes with a gear 18 secured to a driving shaft 19 mounted in bearings in the hangers 15 and in a carrier frame comprising guides 20 mounted upon the top of the base frame. These guides rest upon and are secured to cross pieces 21 extending across the top of the base frame and comprising a part thereof. Each of the guides 20 has an extension 22 at one end and an extension 23 at the opposite end, these extensions being tied together at suitable intervals by cross bars 24 and supported by legs 25.

The guides 20 have openings 26 through which the shaft 19 extends, a bearing for the end of said shaft being secured to one of said guides. Each of said guides has a guide groove to receive and support the side bars 27 of a carrier frame, which are connected by tie plates 28—29 forming a part of the carrier frame. The under sides of the bars 27 each have teeth that constitute a rack, said racks meshing with pinions 30 secured to the driving shaft 19, and as shown in Figure 3 of the drawings.

That cross bar 24 located near one end of the carrier frame has a series of holes in which the ends of supporting tubes 31 are secured, said tubes extending through holes in the other cross bars. Each of the tubes has a slot 32 extending lengthwise thereof, and slots 33 extend through the upper sides of the cross bars into the holes just mentioned. Any suitable number of supporting tubes located side by side may be employed, in the example herein shown, there being eight of said tubes.

Carrier blocks 34 are secured in a recess on the under side of the tie plate 29, as shown in Figures 4 and 6 of the drawings, there being one of said blocks for each of the tubes 31. Each block has a web 35 projecting downwardly from the base of the block and terminating in a head 36. An expander rod 37 is secured in the end of each head, as by means of interengaging screw threads, said rods each being of a length a little shorter than a tube 38 to be operated upon. A clamp 39 is supported as by means of clamp screws 40 near one end of the extensions 23, as shown in Figure 1 of the drawings, this clamp being for the purpose of securing a jig 41 in place on the seats 42 formed on the extensions 23 at one end of each of the side bars 20. Covers 43 are pivotally attached to one of the side bars 20 and to one of the extensions 23, said covers being secured as by means of latch levers 44 pivotally mounted on the cover and engaging a latch on the side bar or extension opposite those to which the covers are pivotally attached. These covers close the space between the side bars and extensions and within which expanding operations take place.

The machine is particularly designed for inserting tubes into a series of fins, said fins being held in jigs. The fins are held in suitably spaced relation in the jigs, and in the example herein shown, the fins are arranged in series with spaces 45 between the series.

In operation the tubes 38 to be operated upon are placed upon the rods 37 with the ends of the tubes resting against the ends of the heads 36, as shown in Figure 6 of the drawings. A guide tip 46 is placed in the end of each of the tubes 38, as shown in Figure 7 of the drawings. It will be understood that a jig having radiating fins 52 held therein for application to the tubes has been placed on the seats 42 and secured by the clamp 39. These fins may be arranged in any suitable manner, it being understood that the holes through the fins will be located in line with the expanding rods and the tubes 38 thereon.

The clutch member 16 is now operated as by means of a clutch lever 47 and a handle 48 therefor whereby the shaft 19 is rotated in a direction to move all of the expanding rods 37 with the tubes 38 thereon through the fins to the opposite end of the jig, forward movement of the plate 29 being ended by any suitable stop and with the ends of the heads 36 against the ends of the tubes 38. The tips 46 are now removed and an expanding mandrel 49 having expanders 50 thereon is secured to the end of each of the rods 37, as by means of interengaging screw threads, and as shown in Figure 8 of the drawings. Each of the mandrels preferably has attached to its extreme end a tube cleaner 51 in the form of a brush with very stiff bristles. The handle 48 is now operated to reverse the direction of rotation of the shaft 19 and the expanding rods 37 with the expanders 50 thereon are drawn backward a slight distance into the tubes to create a space between the ends of the tubes 38 and the tubes 31, the plate 29 having had its forward movement terminated with its front edge in proximity to the front edge of one of the cross bars 24. Movement of the parts being stopped a retaining block 53 having slots 54 to receive the rods 37 but too small for the tubes 38 is placed over the rods in the space between the ends of the tubes and the cross piece 24.

The handle 48 is now again operated to continue the reverse movement and draw the expanders through the tubes thereby to swell said tubes into tight contact with the fins 52. In this operation the cleaner 51 operates to remove any objectionable matter which may have accumulated within the tube. The carrier is moved far enough in this direction to draw the expanders and cleaners out of the ends of the tubes.

The covers 43 may now be raised and the tubes with the fins thereon removed from the machine; it being understood that the fins are loosely enough held in their spaces in the jigs to permit their ready removal. The machine is now ready for a repeated operation.

It is here mentioned that the cross-bars 24 project upwardly between the side bars 27, the projecting upper edges of the cross-bars being approximately level with the upper edges of said side bars. The bars 27 are seated in notches in the cross-bars 24, as shown in Figures 4 and 5 of the drawings, ribs on the ends of said cross-bars entering grooves 55 extending lengthwise along the sides of the side bars 27. Guides 56 project downwardly from opposite ends of the tie plate 28 to engage the side bars of the carrier and guide its movement along the extensions 22.

In accordance with the provisions of the patent statutes we have described the principles of operation of our invention, together with the device which we now consider to represent the best embodiment thereof; but we desire to have it understood that the device shown is only illustrative and that the invention may be carried out by other means and applied to uses other than those above set out.

What we claim is:

1. A tube expanding machine including a support, an expanding rod secured to and projecting from said support to receive thereon a tube to be expanded, means for supporting fins in line with said rod, means for effecting relative movement between said rod with the tube thereon and said fins, and while said rod and tube are maintained in relatively fixed positions, to relatively position the tube within said fins, means for holding said tube and fins in relatively fixed positions, and means for effecting relative movement between said rod and the tube so held to expand the latter.

2. A tube expanding machine including a support, an expanding rod secured to and projecting from said support to receive thereon a tube to be expanded, an expander secured to said rod, means for supporting fins in line with said rod, means for simultaneously moving said support with said rod and tube in one direction to position the fins on said tube, and to position the end of the rod to receive said expander, means for holding said tube and fins in relatively fixed positions, and means for reversely moving said support to withdraw said rod and expander to swell the tube into contact with said fins while held in said position.

3. A tube expanding machine including a carrier, a plurality of expanding rods secured to said carrier and projecting lengthwise thereof to receive thereon tubes to be expanded, means for supporting a jig with fins therein in line with said rods in one position, means for moving said carrier in one direction to simultaneously project said rods and tubes through said fins with the ends of the rods accessible to receive an expanding mandrel, expanding mandrels secured to the ends of said rods, and means for moving said carrier and rod in the opposite direction independently of said tube to swell said tubes into contact with said fins while maintained in said position.

4. A tube expanding machine including a carrier support, means on said support to receive a jig with fins therein, means for holding said jig in one position, a carrier slidably mounted on the support, expanding rods secured to and projecting from the carrier in line with fins supported in said jig, said rods being positioned to receive tubes to be located thereon, means for moving said carrier and said rods and tubes simultaneously in one direction to locate the tubes in said fins while held in said positions, expanders removably secured to said rods, means for holding the tubes in relative fixed positions with respect to said fins, and means for withdrawing said rods through said tubes to swell the latter into contact with said fins while maintained in said positions.

5. A tube expanding machine including a carrier supporting frame, a supporting tube secured to said frame and having a lengthwise slot, a carrier movably mounted on said frame, a carrier block supported by the carrier and projecting through said slot into said tube, an expanding rod secured to said block to receive a tube to be expanded thereon, means for supporting fins in line with said rod, means for moving said carrier in one direction to position said expanding rod and tube within said fins, and means for moving said carrier in the opposite direction to withdraw said rod from said tube to expand the latter.

6. A tube expanding machine including a support, an expanding rod secured to and projecting from said support to receive thereon a tube to be expanded, means for affixing an expander to said rod, means for supporting fins independently of the tube and in line with said rod, means for holding the tube and fins in fixed relationship, means for effecting relative movement between said rod with the tube thereon and said fins while maintaining the tube and rod in fixed relative positions to assemble said fins upon the tube, and means for effecting relative movement between the rod and the fins and tube while the latter are held in relative fixed positions to expand said tube within the fins.

7. A tube expanding machine including a carrier supporting frame, a carrier including a tie-plate extending across the carrier, heads secured to the underside of said tie-plate, expanding rods projecting from said heads to receive tubes to be expanded, means on said heads to receive the ends of said tubes to effect movement thereof simultaneously with said rods, means for supporting fins in line with said rods, means for moving said carrier with the tubes and rods through holes in said fins, means for holding said tubes in relative positions with respect to said fins, and means for reversing movement of the carrier to withdraw the rods from said tubes to expand the latter.

8. A tube expanding machine including a carrier supporting frame, a supporting tube secured to said frame, a carrier movably mounted on said frame, an expanding rod secured to said carrier to extend through and receive thereon a tube to be expanded, means for securing an expander to said rod, means for supporting fins in line with said rod, means for moving said carrier in one direction to position said expanding rod and tube thereon within said fins, and means for moving said carrier in the opposite direction to withdraw said rod from said tube.

ARTHUR J. MASON.
WILLIAM L. TANCRED.